US010259067B2

(12) United States Patent
Beistle et al.

(10) Patent No.: US 10,259,067 B2
(45) Date of Patent: Apr. 16, 2019

(54) REMOTE POLARITY DETECTION AND CONTROL FOR WELDING PROCESS

(71) Applicant: Illinois Tool Works Inc., Glenview, IL (US)

(72) Inventors: Edward Gerard Beistle, Appleton, WI (US); Markus Michael Dantinne, Combined Locks, WI (US); Scott Stephen Liebert, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 559 days.

(21) Appl. No.: 13/872,825

(22) Filed: Apr. 29, 2013

(65) Prior Publication Data
US 2013/0319987 A1 Dec. 5, 2013

Related U.S. Application Data

(60) Provisional application No. 61/655,239, filed on Jun. 4, 2012.

(51) Int. Cl.
*B23K 9/10* (2006.01)
(52) U.S. Cl.
CPC .................. *B23K 9/1087* (2013.01)
(58) Field of Classification Search
USPC ... 219/124.34, 125.1, 125.11, 130.01, 130.5, 219/132
See application file for complete search history.

(56) References Cited

U.S. PATENT DOCUMENTS

| 6,552,303 | B1* | 4/2003 | Blankenship et al. ..... 219/130.5 |
| 2008/0035621 | A1* | 2/2008 | Veik ..................... B23K 9/1068 219/130.1 |
| 2008/0296276 | A1* | 12/2008 | Schartner et al. ........ 219/130.31 |
| 2011/0049116 | A1 | 3/2011 | Rappl |
| 2011/0073569 | A1* | 3/2011 | Rappl .................... B23K 9/095 219/73.2 |

FOREIGN PATENT DOCUMENTS

| CN | 101528404 | 9/2009 |
| WO | 2007137310 | 12/2007 |

OTHER PUBLICATIONS

International Search Report from PCT application No. PCT/US2013/043925 dated Oct. 2, 2013, 11 pgs.

* cited by examiner

*Primary Examiner* — Brian W Jennison
(74) *Attorney, Agent, or Firm* — McAndrews, Held & Malloy, Ltd.

(57) ABSTRACT

A system includes a welding torch, a welding power supply unit, a remote device, and control circuitry. The welding power supply unit is configured to supply power to the welding torch. The remote device is coupled between the welding torch and the welding power supply unit. Additionally, the remote device is configured to detect a polarity of a welding operation. The control circuitry is configured to determine if the detected polarity is appropriate based on one or more welding parameters. Further, the control circuitry is configured to adjust the polarity of the welding operation.

16 Claims, 9 Drawing Sheets

REMOTE POLARITY DETECTION AND CONTROL FOR WELDING PROCESS

CROSS-REFERENCE TO RELATED APPLICATIONS

This application is a Non-Provisional Patent Application of U.S. Provisional Patent Application No. 61/655,239, entitled "Remote Polarity Detection and Control for Welding Process", filed on Jun. 4, 2012, which is herein incorporated by reference in its entirety for all purposes.

BACKGROUND

The present disclosure generally relates to welding systems, and more specifically, to systems and methods to improve the operability of welding systems.

A wide range of welding systems and welding control regimes have been implemented for various purposes. For example, tungsten inert gas (TIG) techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld.

Proper operation of the welding systems may rely on the knowledge of an operator to make appropriate electrode connections within the welding system. Unfortunately, an improper electrode connection may result in a relatively poor quality weld with associated rework, thereby reducing the efficiency and operability of the welding system.

BRIEF DESCRIPTION

In a first embodiment, a system includes a welding torch, a welding power supply unit, a remote device, and control circuitry. The welding power supply unit is configured to supply power to the welding torch. The remote device is coupled between the welding torch and the welding power supply unit. Additionally, the remote device is configured to detect a polarity of a welding operation. The control circuitry is configured to determine if the detected polarity is appropriate based on one or more welding parameters. Further, the control circuitry is configured to adjust the polarity of the welding operation.

In a second embodiment, a method includes detecting a polarity of a welding operation, communicating the polarity to control circuitry, and determining whether the polarity is appropriate based on one or more welding parameters. Detecting the polarity may be performed by a remote device located remotely from a power supply of the welding operation. If the polarity is appropriate, the method includes enabling the welding operation. However, if the polarity is inappropriate, the method includes adjusting one or more output parameters.

In a third embodiment, a system includes detection circuitry and control circuitry. The detection circuitry is disposed at a remote location of a welding operation and is configured to detect a polarity of the welding operation. The control circuitry is configured to communicate with the detection circuitry. Additionally, the control circuitry is configured to determine if the polarity is appropriate based on one or more welding parameters.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is directed towards systems and methods to remotely detect a polarity of a welding operation. In general, the efficiency of the welding operation may be affected by the attachment of welding electrodes to a power supply. If the welding electrodes are improperly connected (e.g., if one of the welding electrodes is not connected, or if the polarity of the welding electrodes is reversed), the welding operation may be adversely affected. Thus, it may be desirable to correct the polarity of the welding electrodes to improve the efficiency of the welding operation. However, the power supply may be distant from the welding operation, and it may be time consuming for an operator to physically swap the welding electrodes. Accordingly, a remote device may provide for detection and correction of the polarity at a location that is proximal to the welding operation. The remote device may transmit signals defining the operational parameters of the welding operation to and from the power supply, generally referred to as remote control.

Figure 1:
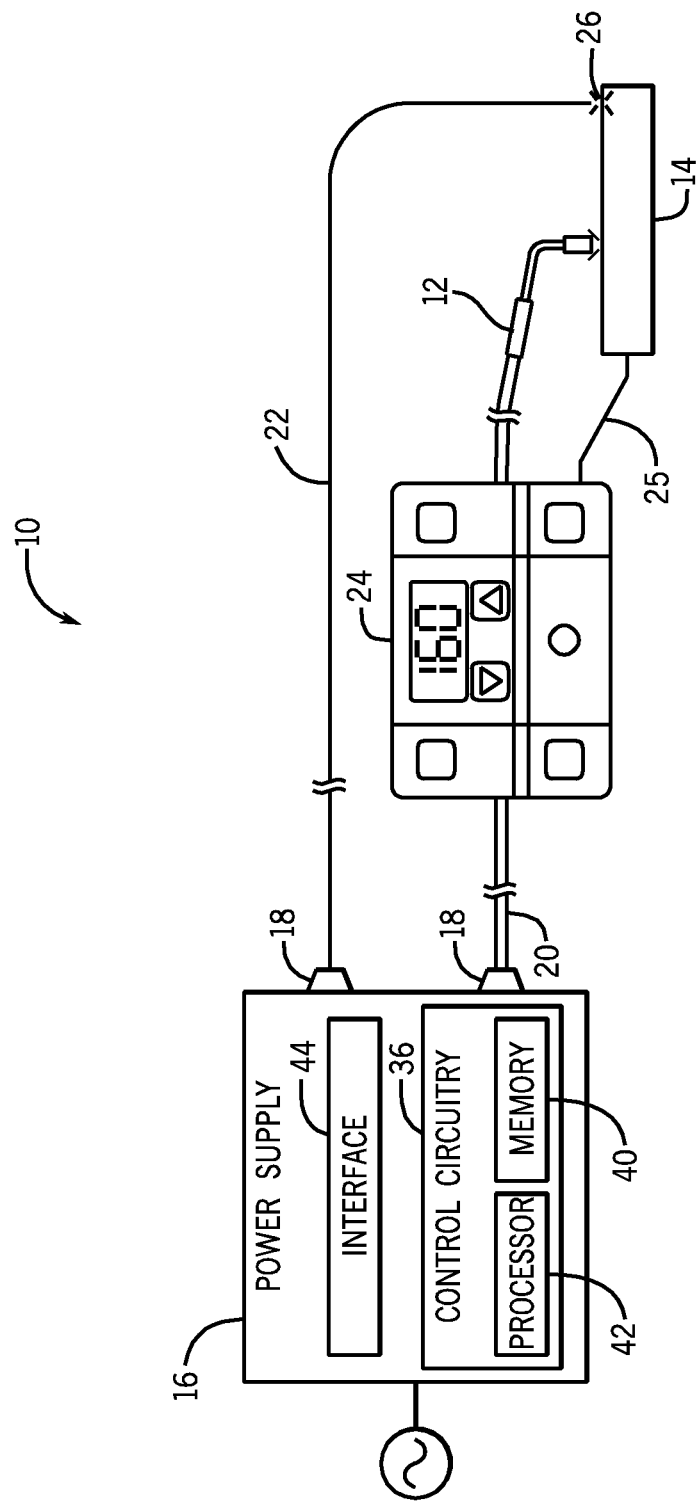
FIG. 1 is a schematic diagram of an embodiment of a welding system that includes a remote device configured to detect a polarity of a welding operation.

Turning now to the figures, FIG. 1 illustrates an exemplary welding system 10 that includes a welding torch 12 and a work piece 14. A power supply 16 includes multiple studs 18 that may accommodate one or more welding electrodes to form an electrical circuit to facilitate a welding operation. As illustrated, the power supply 16 provides power to the welding torch 12 via a welding torch cable 20. The welding torch cable 20 is connected to one of the studs 18 (e.g., a positive stud). In addition, a work cable 22 is connected to one of the studs 18 (e.g., a negative stud, or the opposite stud to which the welding torch cable 20 is connected) and the work piece 14 via a clamp 26. The welding torch cable 20 and the work cable 22 form a complete circuit between the power supply 16, the welding torch 12, and the work piece 14. This electrical circuit may generate a relatively large amount of heat, causing the work piece 14 to transition to a molten state, thereby facilitating the welding operation. However, if the cables 20, 22 are connected to the studs 18 of the power supply 16 improperly (e.g., with the cables 20, 22 being connected to the opposite studs 18), the welding operation may be relatively inefficient.

The connection of the welding torch cable 20 and the work cable 22 to the studs 18 may generally define a polarity of the welding operation (e.g., a positive polarity or a negative polarity). Swapping the welding torch cable 20 and the work cable 22 may reverse the polarity (e.g., change the positive polarity to a negative polarity or vice versa). Different welding processes may be more efficient with certain polarities. For example, stick welding may generally be performed with a positive polarity (e.g., direct current electrode positive, or DCEP). On the other hand, TIG welding may generally be performed with a negative polarity (e.g., direct current electrode negative, or DCEN). When the polarity of the welding operation is incorrect, it may be time consuming for an operator to physically swap the cables 20, 22. In certain welding systems, the cables 20, 22 may be hundreds of feet long, and the power supply 16 may be distant from the welding operation.

Accordingly, it may be desirable to detect, communicate, and/or control the polarity using a remote device 24 disposed at a remote location that is proximal to the welding torch 12, as will be described in detail further below. As illustrated in FIG. 1, the remote device 24 is a separate, portable device that may be connected to the welding torch cable 20 between the power supply 16 and the welding torch 12. The remote device 24 is connected in line with, and is powered by, the welding torch cable 20. A work sensing line 25 is coupled to the remote device 24 and the work piece 14 to enable the remote device 24 to receive power and detect the polarity even when the welding torch 12 is not operating. More specifically, the work sensing line 25 completes an electrical circuit between the power supply 16, the remote device 24, the work piece 14, and back to the power supply 16 to enable the polarity to be detected.

As described in greater detail below, the remote device 24 includes a display and control features that are substantially similar to a display and control features on the power supply 16. More specifically, the remote device 24 includes a display for displaying the amperage of the welding operation, and control features for increasing or decreasing the amperage of the welding operation, switching between stick and TIG welding operations (or other types of welding processes), setting a type of welding electrode, and so forth. In other words, the remote device 24 includes similar functionality as the power supply 16 for displaying and adjusting welding parameters of the welding operation.

As illustrated, the power supply 16 includes control circuitry 36 that, in turn, includes memory components 40, to store programming instructions, software programs, historical data, and so forth. For example, among other information, the memory components 40 may store various types of welding processes along with their preferred welding polarities (e.g., DCEP or DCEN). The control circuitry 36 also includes a processing device, such as a processor 42, among others types of processing devices, to control the welding system 10. In particular, the processor 42 may implement software instructions stored in the memory 40 to control the polarity of the welding operation.

The control circuitry 36 is configured to control the power supply 16 based on the polarity of the welding operation. For example, if the polarity of the welding operation is inappropriate, the control circuitry 36 may automatically send a signal to reverse the polarity. To this end, in certain embodiments, the power supply 16 may include polarity reversing switches, and the control circuitry 36 may send a signal to open or close these switches. In certain embodiments, reversing the polarity of the welding operation may be initiated by an operator using an interface 44 of the power supply 16 or an interface of the remote device 24.

The interface 44 may include input devices such as a keypad, stylus, pushbuttons, dials, or any form of transducer that converts a physical interaction with the interface 44 into an electrical signal input. In certain embodiments, the interface 44 may also include a display screen to display graphics, buttons, icons, text, windows, and similar features relating to information about the welding system 10. For example, the user interface 44 may display graphical indicators of welding parameters, messages indicating a status of the welding system 10, or both. In addition, the interface 44 may alert the operator if the cables 20, 22 are improperly connected to the power supply 16. For example, the polarity of the cables 20, 22 may be reversed. The interface 44 may display a message (e.g., "Check Polarity") to alert the operator of the improper connection, and may suggest a corrective action to the operator, as described further below.

Figure 2:
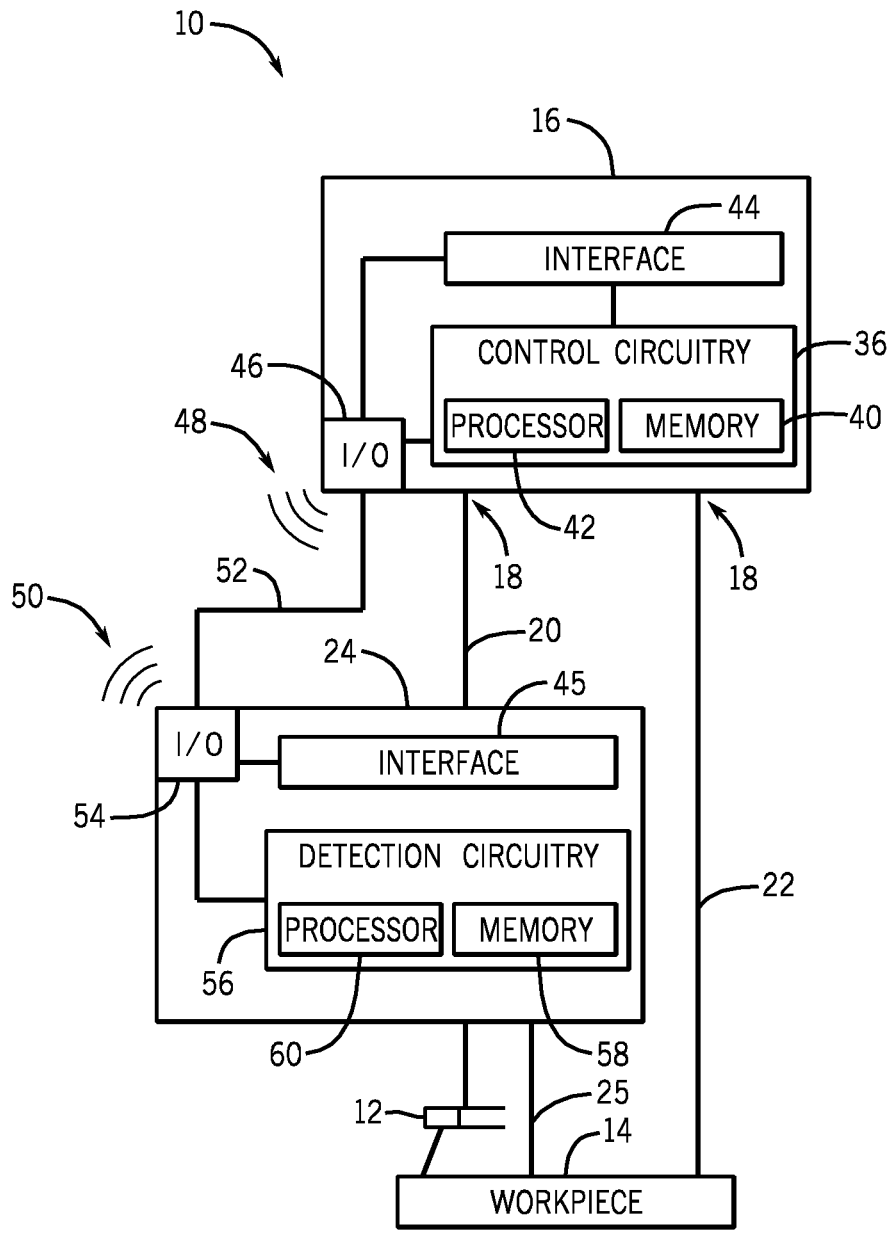
FIG. 2 is a schematic diagram of an embodiment of the welding system of FIG. 1, illustrating communication between the remote device and welding resources.

FIG. 2 is a schematic diagram of the welding system 10 of FIG. 1, illustrating communication between the remote device 24 and the power supply 16. As illustrated, the power supply 16 includes the interface 44 and the control circuitry 36. The power supply 16 also includes an input/output (I/O) interface 46 that is configured to communicate with the remote device 24. As illustrated in FIG. 2, in certain embodiments, the I/O interface 46 may communicate with the remote device 24 using wireless communications (e.g., wireless signals 48, 50). However, in other embodiments, the I/O interface 46 may communicate with the remote device 24 using weld cable communications (WCC) through the welding torch cable 20. As a further example, in certain embodiments, wired communication may be provided via communication cable 52. The interface 44, the control circuitry 36, and the I/O interface 46 are coupled together to enable operator initiation of reversing the polarity of the welding operation.

As shown, the remote device 24 also includes an interface 45. As discussed above, in certain embodiments, the interfaces 44, 45 of the power supply 16 and the remote device 24 may be substantially similar, and each interface 44, 45 may allow for operator initiation of reversing the polarity of the welding operation. As previously noted, the welding torch cable 20 and the work cable 22 may be hundreds of feet long, and having the remote device 24 proximate to the welding torch 12 may improve the operability of the welding system 10.

The remote device 24 also includes an I/O interface 54 that is communicatively coupled to the power supply 16. The I/O interface 54 may communicate with the I/O interface 46 of the power supply 16 using wireless communications, WCC through the welding torch cable 20, the communication cable 52, or a combination thereof. The remote device 24 also includes detection circuitry 56. The detection circuitry 56 is configured to detect the polarity of the welding operation. In certain embodiments, the detection circuitry 56 includes memory components 58, to store programming instructions, software programs, historical data, and so forth. The detection circuitry 56 may also include a processing device, such as a processor 60, among others types of processing devices, to determine the polarity of the welding system 10. In particular, the processor 60 may implement software instructions stored in the memory 58 to detect the polarity of the welding operation. As shown, the interface 45, the detection circuitry 56, and the I/O interface 54 of the remote device 24 are coupled together to enable detection of the polarity of the welding operation.

The detection circuitry is configured to detect the polarity of the welding operation and transmit the polarity information to the control circuitry 36 of the power supply 16 via the I/O interfaces 46, 54 (signals 48, 50). When the control circuitry 36 of the power supply 16 receives the polarity information, the control circuitry 36 may determine if the polarity is appropriate based on parameters of the welding system 10, which may be set using either the interface 44 of the power supply 16 or the interface 45 of the remote device 24. These parameters may include a type of welding process (e.g., stick, TIG, or other type of welding process), and may be input by an operator via either of the interfaces 44, 45. If the polarity is inappropriate for the given parameters of the welding system 10, the control circuitry 36 may send a signal to the interface 44 of the power supply 16, which may cause the interface 44 to display a message (e.g., "Check Polarity") indicating that the polarity is inappropriate. The control circuitry 36 may also send the signal to the interface 45 of the remote device 24 via the I/O interfaces 46, 54. As a result, the interface 45 of the remote device 24 may also display the message (e.g., "Check Polarity") indicating that the polarity is inappropriate. Thus, the control and detection circuitry 36, 56, may communicate with each other to enable the interfaces 44, 45 to display the same messages and generally be in sync with each other.

The response of the control circuitry 36 to an inappropriate polarity may vary based on the type of welding process. For example, when the polarity is reversed for a stick welding process, the control circuitry 36 may cause the interfaces 44, 45 to display a message (e.g., "Check Polarity") and/or illuminate a warning light indicating the reversed polarity. As may be appreciated by one skilled in the art, it may be desirable to operate a stick welding process with a reversed polarity (DCEN). However, when the polarity is reversed for a TIG welding process, the control circuitry 36 may disable the welding operation after a time delay. Operating a TIG welding process with a reversed polarity may result in fouled tungsten, relatively poor welds with associated rework, and other undesirable effects. In certain embodiments, the time delay may be between approximately 0.1 to 1 seconds, approximately 0.2 to 0.9 seconds, or approximately 0.3 to 0.8 seconds. The response of the detection and control circuitry 36, 56 to various welding processes and welding polarities are described further below in FIGS. 3-6. These responses are provided by way of example only, and are not intended to be limiting.

In the embodiment previously described, the detection circuitry 56 of the remote device 24 detects a polarity and communicates the polarity to the control circuitry 36 of the power supply 16, which determines if the polarity is appropriate and, in certain embodiments, disables the welding operation (e.g., by disabling the weld output from the power supply 16) if the polarity is inappropriate. However, in certain embodiments, these functions may be allocated differently between the circuitry 36, 56. For example, the detection circuitry 56 of the remote device 24 may detect the polarity, receive the welding parameters input via the interfaces 44, 45, and determine if the polarity is appropriate (e.g., instead of the control circuitry 36 of the power supply 16 determining if the polarity is appropriate). In this embodiment, the detection circuitry 56 may send a signal to the interfaces 44, 45 to display the message indicating that the polarity is inappropriate. In addition, in certain embodiments, the detection circuitry 56 may remotely disable the welding operation (e.g., by disabling the weld output from the power supply 16) via a relay or other power electronics. In other words, in certain embodiments, the detection circuitry 56 of the remote device 24 may function as the control circuitry that controls the power supply 16 and the remote device 24 with respect to the polarity. Additionally or alternatively, the control and detection circuitry 36, 56, may detect the polarity and determine if the polarity is appropriate together. For example, in such an embodiment, the polarity may be determined to be inappropriate only if both of the control circuitry 36 and the detection circuitry 56 each determine so.

FIGS. 3-6 are schematic diagrams of the welding system 10 using various welding processes with various polarities. FIGS. 7-10 illustrate the interface 45 of the remote device 24 for each of the embodiments of the welding system 10 illustrated in FIGS. 3-6, respectively. As such, FIGS. 7-10 provide more detailed views of the interface 45 of the remote device 24 during the various welding processes and various polarities of FIGS. 3-6, respectively. As discussed above, the interface 44 of the power supply 16 and the interface 45 of the remote device 24 are substantially similar. As such, it will be appreciated that the interface 45 of the remote device 24 depicted in FIGS. 7-10 is substantially similar and, in certain embodiments, identical to the interface 44 of the power supply 16. Therefore, the remote device 24 and the power supply 16 have substantially similar welding parameter display and welding parameter adjustment features.

In particular, as illustrated in FIGS. 7-10, the interface 45 of the remote device 24 (as well as the interface 44 of the power supply 16) include an LED display 62 for displaying information to the operator of the welding system 10, a stick process button 64 and a TIG process button 66, which can be used to toggle the welding process between stick and TIG welding processes, an adjustable parameter control feature 68 for adjusting a welding parameter of the welding process, such as current amperage, an electrode button 70 for toggling between electrode types, a hidden button 72 that may be used for several various features, and an in use button 74. As illustrated, the adjustable parameter control feature 68 may take the form as a decrease button and an increase button for decreasing or increasing a welding parameter, respectively. However, in other embodiments, the adjustable parameter control feature 68 may be any other adjustment feature, such as a knob, slider, and so forth.

Figure 3:
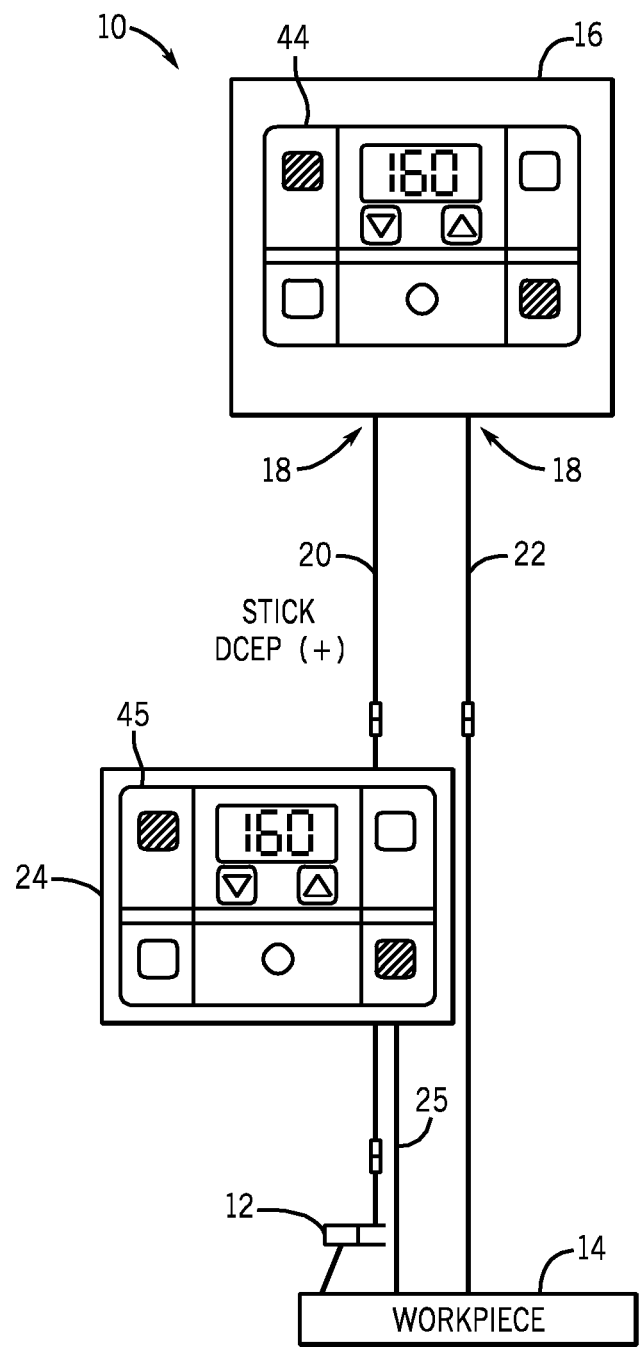
FIG. 3 is a schematic diagram of an embodiment of a welding system illustrating the remote device of FIG. 1 in a stick welding process with a positive polarity.

FIG. 3 is a schematic diagram of the welding system 10, illustrating the remote device 24 in a stick welding process with a positive polarity (e.g., DCEP). For clarity, certain elements, such as the I/O interfaces 46, 54 and the communication cable 52, are not shown. The welding torch cable 20 and the work cable 22 are connected to the studs 18 of the power supply 16, such that the polarity of the welding operation is positive. The detection circuitry 56 detects the positive polarity and communicates the positive polarity to the control circuitry 36 (e.g., via the I/O interfaces 46, 54). Because stick welding may typically be performed in DCEP, the LED displays 62 of the interfaces 44, 45 do not display error messages or illuminate warning lights. Rather, as illustrated, the LED displays 62 of the interfaces 44, 45 display a welding parameter (e.g., the current amperage flowing through the cables 20, 22).

Figure 4:
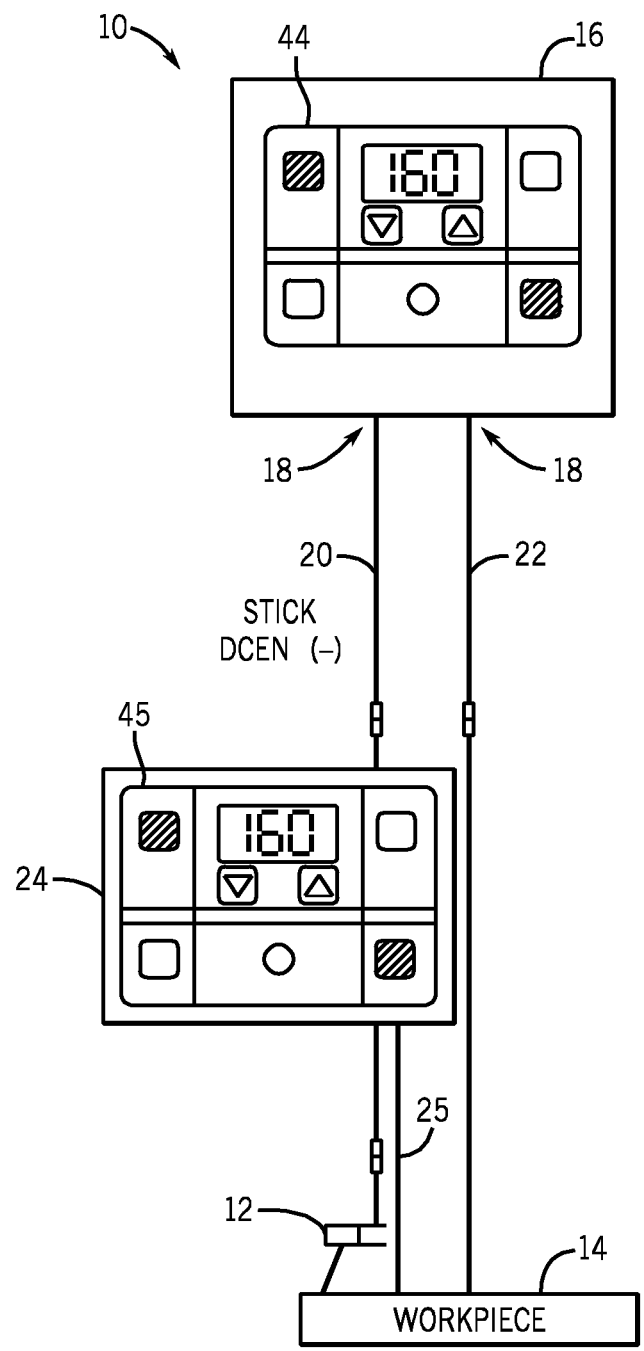
FIG. 4 is a schematic diagram of an embodiment of a welding system illustrating the remote device of FIG. 1 in a stick welding process with a negative polarity.

FIG. 4 is a schematic diagram of the welding system 10, illustrating the remote device 24 in a stick welding process with a negative polarity (e.g., DCEN). Again, for clarity, certain elements are not shown. The welding torch cable 20 and the work cable 22 are connected to the power supply 16, such that the polarity of the welding operation is negative. The detection circuitry 56 detects the negative polarity and communicates the negative polarity to the control circuitry 36 (e.g., via the I/O interfaces 46, 54). Because stick welding may typically be performed in DCEP, the interfaces 44, 45 may illuminate a warning light to indicate the negative polarity. For example, as illustrated more clearly in FIG. 8, a DCEN stick negative indicator 76 may be illuminated when a stick welding process is selected via the stick process button 64 and the cables 20, 22 are connected to the power supply 16 such that the polarity of the welding operation is negative.

Because the operator may, indeed, want to use a stick welding process with a negative polarity, the LED displays 62 of the interfaces 44, 45 do not display error messages or illuminate warning lights. Rather, as illustrated, the LED displays 62 of the interfaces 44, 45 display a welding parameter (e.g., the current amperage flowing through the cables 20, 22). However, in certain embodiments, the control circuitry 36 of the power supply 16 may disable the welding operation until an operator takes corrective action such as disconnecting and properly re-connecting the cables 20, 22, at which point the DCEN stick negative indicator 76 may cease to be illuminated. This may reduce the likelihood of welding with an inappropriate polarity, and may increase operability of the welding system 10.

Figure 5:
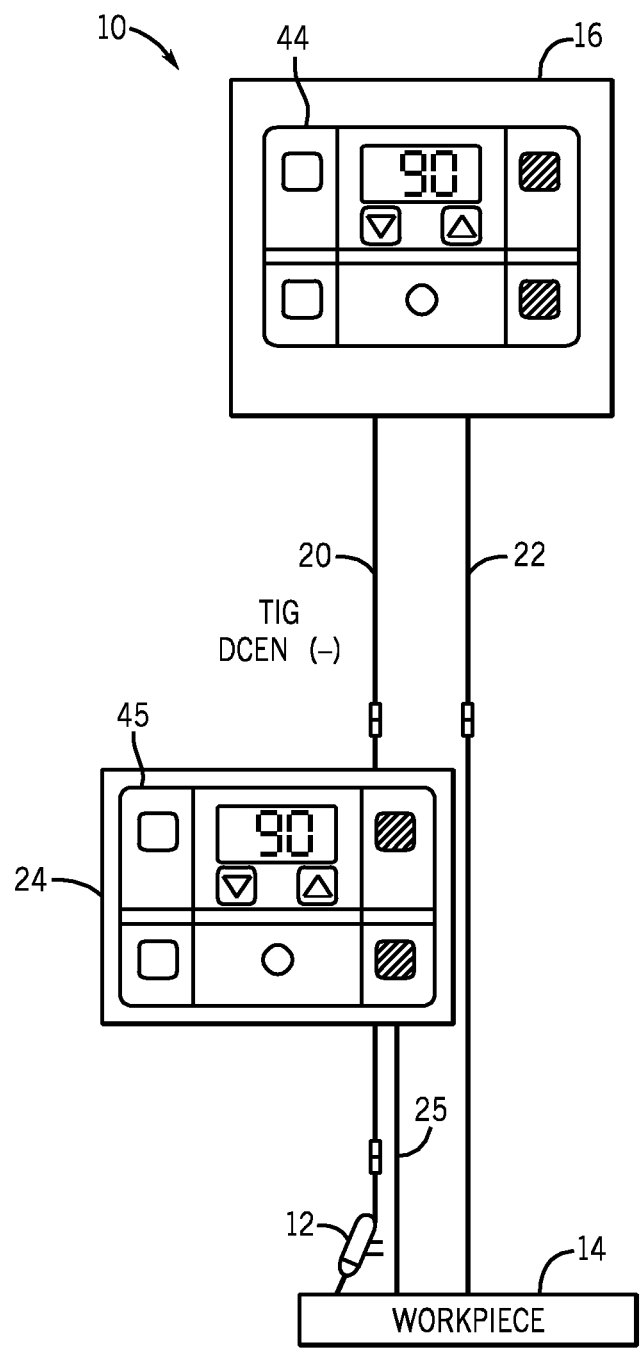
FIG. 5 is a schematic diagram of a an embodiment of a welding system illustrating the remote device of FIG. 1 in a TIG welding process with a negative polarity.

FIG. 5 is a schematic diagram of the welding system 10, illustrating the remote device 24 in a TIG welding process with a negative polarity (e.g., DCEN). Again, for clarity, certain elements are not shown. The welding torch cable 20 and the work cable are connected to the power supply 16, such that the polarity of the welding operation is negative. The detection circuitry 56 detects the negative polarity and communicates the negative polarity to the control circuitry 36 (e.g., via the I/O interfaces 46, 54). Because TIG welding may typically be performed in DCEN, the LED displays 62 of the interfaces 44, 45 do not display error messages or illuminate warning lights. Rather, as illustrated, the LED displays 62 of the interfaces 44, 45 display a welding parameter (e.g., the current amperage flowing through the cables 20, 22).

Figure 6:
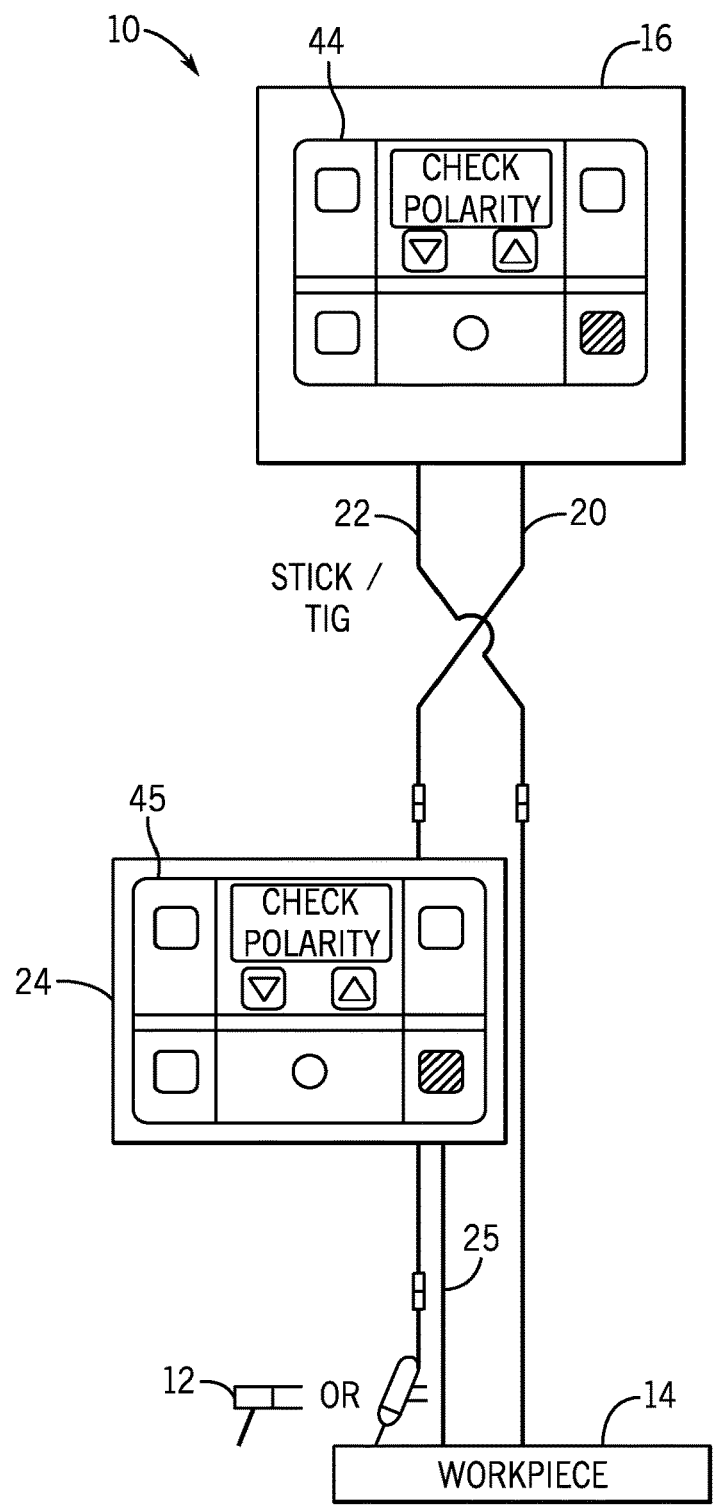
FIG. 6 is a schematic diagram of an embodiment of a welding system illustrating the remote device of FIG. 1 in a TIG welding process with a positive polarity or a stick welding process with an unintended negative polarity.
Figure 7:
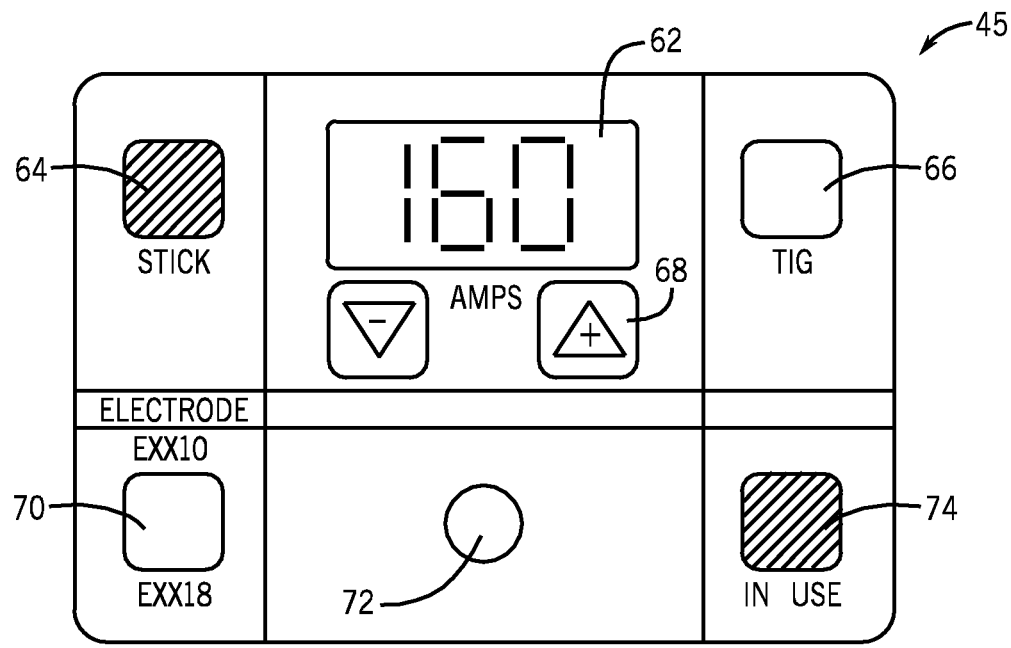
FIG. 7 is a front view of the remote device in a stick welding process with a positive polarity, corresponding to FIG. 3.
Figure 8:
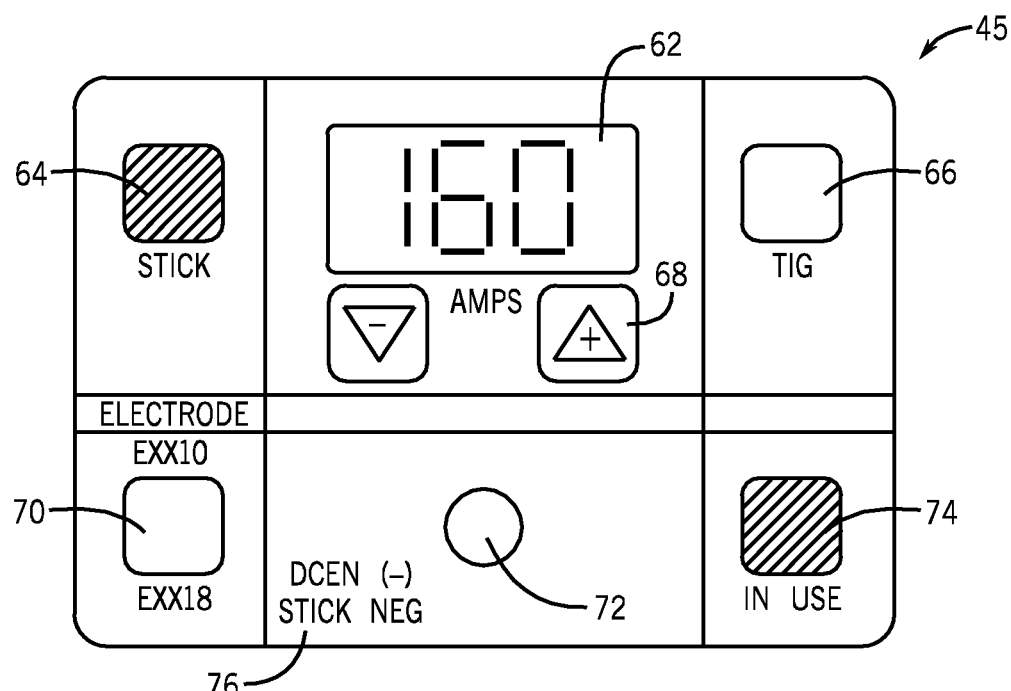
FIG. 8 is a front view of the remote device in a stick welding process with a negative polarity, corresponding to FIG. 4.
Figure 9:
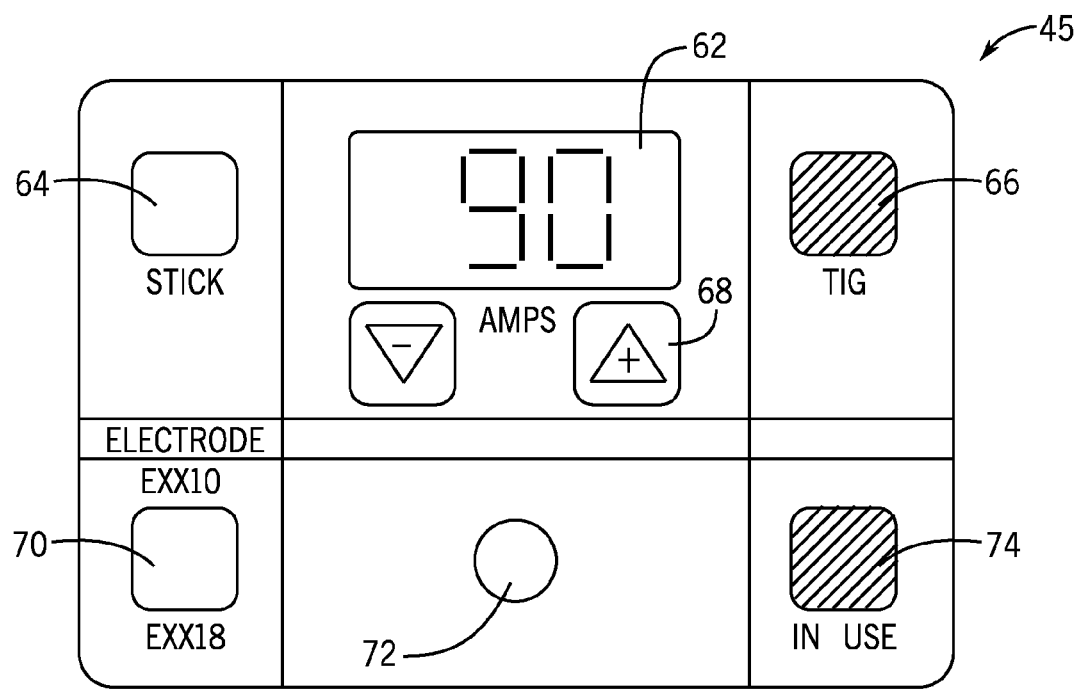
FIG. 9 is a front view of the remote device in a TIG welding process with a negative polarity, corresponding to FIG. 5.
Figure 10:
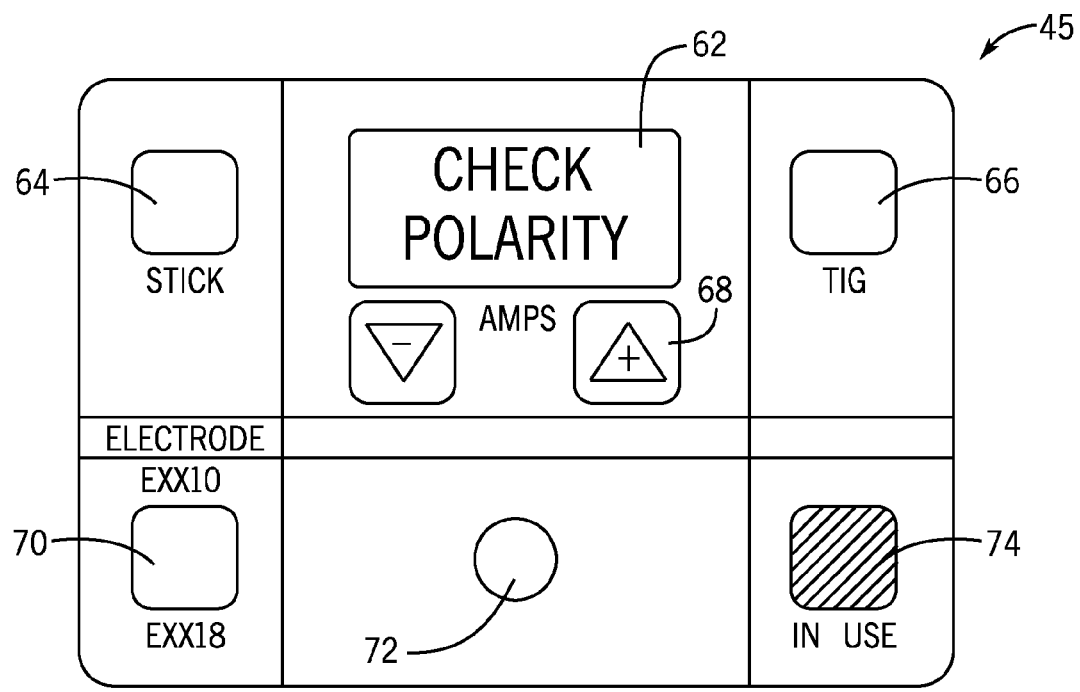
FIG. 10 is a front view of the remote device in a TIG welding process with a positive polarity or a stick welding process with an unintended negative polarity, corresponding to FIG. 6.

FIG. 6 is a schematic diagram of the welding system 10, illustrating the remote device 24 in a TIG welding process with a positive polarity (e.g., DCEP). Again, for clarity, certain elements are not shown. The welding torch cable 20 and the work cable 22 are connected to the studs 18 of the power supply 16, such that the polarity of the welding operation is positive. The detection circuitry 56 detects the positive polarity and communicates the positive polarity to the control circuitry 36 (e.g., via the I/O interfaces 46, 54). Because TIG welding may typically be performed in DCEN, the LED displays 62 of the interfaces 44, 45 may illuminate a warning light and display an error message (e.g., "Check Polarity") to indicate the positive polarity. In addition, as opposed to simply receiving confirmation from the operator, such as with stick welding, the control circuitry 36 may disable the welding operation until the cables 20, 22 are reversed, polarity reversing switches of the power supply 16 are activated via the interfaces 44, 45, or the polarity is otherwise corrected. In certain embodiments, any welding process of incorrect polarity caused by reversed cables may be disabled, thereby requiring the cables 20, 22 to be correctly connected per the welding process. Thus, a welding system 10 with polarity detection and reversing capabilities may still have the ability to disable weld output until the cables 20, 22 are properly connected. This may reduce the likelihood of welding with an inappropriate polarity, and may increase operability of the welding system 10. In certain embodiments, the control circuitry 36 may automatically correct the polarity, even without input from the operator. Accordingly, the logic implemented by the circuitry 36, 56 may be implementation-specific, and may vary among embodiments based on the type of welding process.

Although described herein as being used with stick welding processes and TIG welding processes, the detection, communication, and control of the welding polarity may be implemented in other welding processes, such as gas metal arc welding (GMAW), metal inert gas (MIG), metal active gas (MAG), self-shielding flux core (FCAW-S), and the like. The preference for DCEP or DCEN may vary for each type of welding process, and the response of the control circuitry 36 or detection circuitry 56 to an inappropriate polarity may also vary, as discussed previously.

Figure 11:
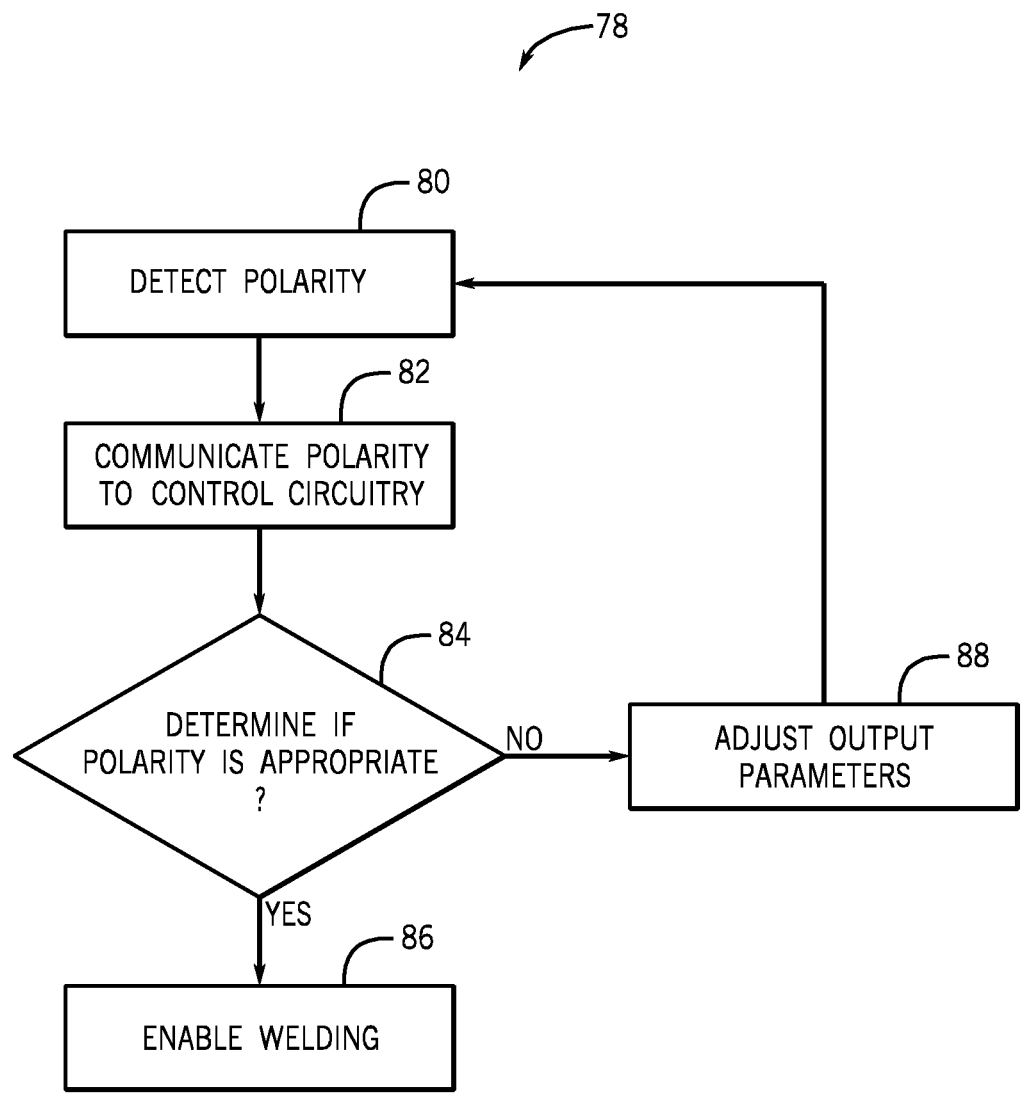
FIG. 11 is a flow chart of an embodiment of a method to detect, communicate, and control a welding polarity.

FIG. 11 is a flow chart of an embodiment of a method 78 to detect, communicate, and control the welding polarity to increase the operability of a welding operation. The detection circuitry 56 of the remote device 24 may detect (block 80) a polarity of the welding operation remotely from the power supply 16, based on the connection of the welding torch cable 20 and work cable 22 to the power supply 16. For example, detection (block 80) of the polarity may include sensing a voltage of each stud 18, a current flowing through the cables 20, 22, or both. Detecting (block 80) the polarity using voltages may be desirable, as it enables polarity detection in an open circuit. Additionally or alternatively, detecting (block 80) the polarity using both the voltage and the current may be desirable, as it enables polarity detection in a short circuit.

The detection circuitry 56 may then communicate (block 82) the polarity information to the control circuitry 36 of the power supply 16 via the I/O interfaces 46, 54. The control circuitry 36 may receive the polarity information and determine (decision 84) if the polarity is appropriate based on one or more welding parameters. Again, in certain embodiments, it may be the detection circuitry 56 of the remote device 24 that determines (decision 84) if the polarity is appropriate based on the one or more welding parameters, or the control and detection circuitry 36, 56 may make the determination (decision 84) collectively. To determine (decision 84) if the polarity is appropriate, the control circuitry 36 and/or the detection circuitry 56 may use inputs from the operator that relate to a type of welding process (e.g., stick, TIG, or other type of welding process), as well as a generally preferred polarity for the type of welding process (e.g., DCEP or DCEN).

If the polarity is determined (decision 84) to be appropriate, the control circuitry 36 may enable (block 86) the welding operation to initiate or continue. However, if the polarity is determined (decision 84) to be inappropriate, the control circuitry 36 may adjust (block 88) output parameters of the welding system 10. The output parameters may include messages displayed on the LED displays 62 of the interfaces 44, 45, illumination of warning lights on the interfaces 44, 45 (e.g., the DCEN stick negative indicator 76), or both. Further, adjusting (block 88) the output parameters may include disabling the welding operation until the operator acknowledges the inappropriate polarity, or takes corrective action to fix the inappropriate polarity. Disabling the welding operation may be implemented after a time delay of, for example, 0.25 seconds. Still further, in certain embodiments, adjusting (block 88) the output parameters may include automatically reversing the polarity of the welding operation without operator input.

Again, although described herein as being the control circuitry 36 of the power supply 16 that performs the methods steps of enabling or disabling (block 86) the welding operation (e.g., enabling or disabling the weld output of the power supply 16 to the welding torch 12 via the remote device 24) and adjusting output parameters (block 88), in certain embodiments, the detection circuitry 56 of the remote device 24 may at least partially perform these method steps. For example, the detection circuitry 56 of the remote device 24 may remotely enable or disable the weld output from the power supply 16, and may remotely adjust output parameters displayed on the interface 44 of the power supply 16, as well as its own interface 45.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a welding power supply unit configured to supply power to a welding torch;
a remote device coupled between the welding torch and the welding power supply unit via a weld cable and comprising detection circuitry configured to detect a polarity of a welding operation; and
control circuitry configured to determine if the polarity is appropriate based on one or more welding parameters and to adjust the polarity of the welding operation, wherein the welding power supply unit comprises the control circuitry.

2. The system of claim 1, wherein the remote device is configured to communicate the polarity to the control circuitry using weld cable communication (WCC), wireless communication, wired communication, or any combination thereof.

3. The system of claim 1, wherein the remote device comprises a user interface configured to display messages and to enable a user to adjust welding parameters of the welding operation.

4. The system of claim 3, wherein the user interface is configured to display an error message or display a warning light when the polarity is inappropriate.

5. The system of claim 1, wherein the control circuitry is configured to disable the welding operation after a time delay when the polarity is inappropriate.

6. The system of claim 5, wherein the control circuitry is configured to re-enable the welding operation after having previously disabled the welding operation, in response to an operator input.

7. The system of claim 1, wherein the control circuitry is configured to automatically adjust the polarity based on the one or more welding parameters.

8. The system of claim 1, wherein the one or more welding parameters includes a type of welding process.

9. A method, comprising:
detecting a polarity of a welding operation via detection circuitry of a remote device located remotely from a welding power supply unit of the welding operation and proximate to a welding torch of the welding operation, wherein the remote device is coupled between the welding power supply unit and the welding torch via a weld cable;
communicating the polarity from the remote device to control circuitry of the welding power supply unit;
determining, using the control circuitry, whether the polarity is appropriate based on one or more welding parameters;
enabling, using the control circuitry, the welding operation when the polarity is appropriate; and
adjusting, using the control circuitry, one or more output parameters when the polarity is inappropriate.

10. The method of claim 9, comprising communicating the polarity to the control circuitry using weld cable communication (WCC), wireless communication, wired communication, or any combination thereof.

11. The method of claim 9, wherein determining whether the polarity is appropriate is based on a type of welding process.

12. The method of claim 9, wherein adjusting the one or more output parameters comprises displaying an error message or warning light when the polarity is inappropriate.

13. The method of claim 9, wherein adjusting the one or more output parameters comprises disabling the welding operation after a time delay when the polarity is inappropriate.

14. The method of claim 9, wherein adjusting the one or more output parameters comprises automatically reversing the polarity when the polarity is inappropriate.

15. A system, comprising:
detection circuitry of a portable remote device disposed at a location remote from a welding power supply unit of a welding operation and configured to detect a polarity of a welding operation; and
control circuitry of the welding power supply unit configured to communicate with the detection circuitry and to determine if the polarity is appropriate based on one or more welding parameters;
wherein the portable remote device is configured to be coupled between a welding torch and the welding power supply unit via a weld cable that supplies power to the welding torch via the portable remote device, wherein the portable remote device comprises the detection circuitry.

16. A system, comprising:
detection circuitry of a portable remote device disposed at a location remote from a welding power supply unit of a welding operation and configured to detect a polarity of a welding operation; and
control circuitry of the welding power supply unit configured to communicate with the detection circuitry and to determine if the polarity is appropriate based on one or more welding parameters;
wherein the welding power supply unit is configured to supply power to a welding torch; and
the portable remote device is configured to be coupled between the welding power supply unit and the welding torch via a weld cable, wherein the portable remote device comprises the detection circuitry.

* * * * *